Aug. 10, 1926.

C. S. CLARK

PISTON RING

Filed Dec. 11, 1923

1,595,855

Inventor
Cornelius S. Clark

By
Attorney

Patented Aug. 10, 1926.

1,595,855

UNITED STATES PATENT OFFICE.

CORNELIUS S. CLARK, OF NORFOLK, VIRGINIA.

PISTON RING.

Application filed December 11, 1923. Serial No. 680,032.

This invention relates to piston rings and has for its object the construction of novel sealing means for the compression chambers of engines, pumps, and like devices. It finds, perhaps, its most useful adaptation when applied to the pistons of internal combustion engines in which the existent high temperature and pressure, and the high speed of piston travel, introduce peculiar conditions which require the use of special sealing means.

The further objects thereof will be hereinafter more fully set forth in the description of the invention which consists in the new and novel features of construction and combinations of parts hereinafter set forth and claimed.

In the accompanying drawings:—

Figure 1:
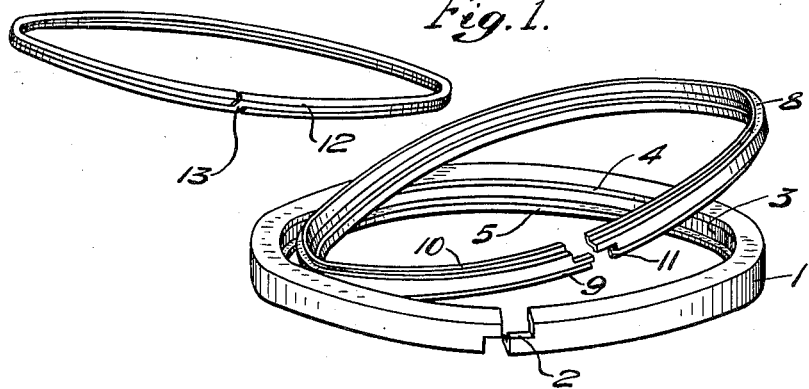
Figure 1 is a perspective view showing the parts of my improved piston ring, disassembled.

Referring now in detail to the structural features of the piston ring, it consists essentially of an outer piston-engaging shoe 1 formed with a stepped cut 2 and normally expanded, so that when placed within the cylinder it is under tension, exerting a uniform pressure against the cylinder walls. The rear face of the shoe portion 1 is provided with a channel 3 which is preferably machined to present a true cylindrical surface at the bottom, and forming flanges 4 and 5, the inwardly facing ends 6 and 7 of which are also machined so as to be truly cylindrical.

Figure 2:
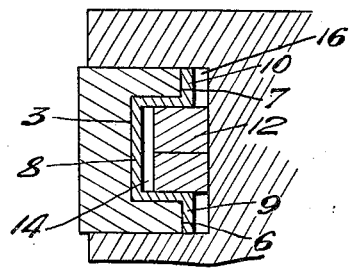
Figure 2 is a cross section through one side of the piston ring showing the same applied to the ordinary form of piston ring groove.
Figure 3:
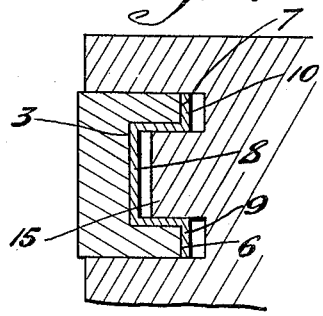
Figure 3 is a similar view showing the piston ring inserted in a groove of special construction.
Figure 4:
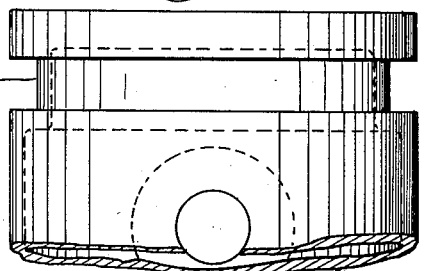
Figures 4 and 5 are side elevations of two pistons, parts being broken away, one showing the ordinary form of piston ring groove and the other the modified groove illustrated in section in Figure 3.
Figure 5:
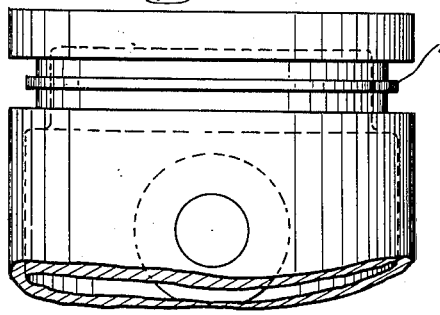

An inner ring 8 is adapted to seat within said channel, said inner ring being preferably a rolled channel-shaped member having outwardly extending flanges 9 and 10 which rest against the faces 6 and 7 of the flanges of the outer shoe 1. The inner ring 8 is also provided with a stepped cut 11 and is normally expanded so that it, too, exerts tension radially outward when positioned within the cylinder. The dimensions of the co-acting surfaces of the shoe 1 and inner ring 8 are so proportioned that there is substantially no clearance between the seating portions of said rings and it will be noted from the illustration in Figure 1 that the stepped cuts in said shoe and inner ring are oppositely disposed, so that should the inner ring be assembled within the shoe 1 with the cut portions at the same point the vertical planes of the cut surfaces will be out of registry, thus minimizing the chance of leakage of gas clear through both rings by way of the stepped cuts. The inner ring and shoe are preferably made of dissimilar metals the former being of tempered steel while the latter is of cast iron to avoid excessive wear of the cylinder walls. A third ring 12, which from its function may be termed an adaptor is insertible within the channel of the inner ring 8. Said adaptor is rectangular in cross section, as shown in Figure 2, and is formed of a steel band wound twice around, as seen in Figure 1, and being slightly offset at 13 adjacent the two ends so that the upper and lower faces thereof will lie in parallel planes. Said adaptor is normally contracted and is designed to seat against the flat bottom wall of the ordinary piston groove 16 shown in Figure 2, and to frictionally engage said wall with sufficient force to retain a fixed position. The adaptor is placed in position by spreading it longitudinally and threading it over the top of the piston until it snaps within the groove. Slight lateral clearance is provided between the adaptor 12 and the bottom of the channeled portion of the inner ring 8, as shown at 14 in Figure 2. The adaptor, when used, thus becomes virtually a part of the piston itself rather than part of the ring.

In the case of a piston which is especially grooved for the reception of my improved piston ring, a rectangular annular bead 15 may be formed integral with the piston at the bottom of the groove, taking the place of the adaptor and seating within the channel portion of the inner ring 8. In this instance the height of the bead 15 is designed to provide slight lateral clearance between said bead and the piston ring.

It is clear from the above disclosure that I have designed a piston ring which is as practically leakproof as is possible in a device of this character. In order to leak past the ring, in either of its forms, gas must of necessity pass either between the inner ring and shoe, following a path which is practically impossible because of its tortuousness and the neatness of fit of the engaging surfaces, or between the inner ring and the adaptor, which is also tortuous, or through the stepped cut, between the outer shoe and inner ring where not only is the fit of the parts too close to permit of substantial leakage, but any gas finding its way between said parts is confronted by the flanges 9 and 10 upon the inner ring which bear closely against the ends of the flanges 6 and 7 of the outer shoe. It is also apparent that the arrangement of the cast iron and steel ring members in close contact, without clearance causes said members to function as a single integral element partaking of the softness of cast iron where such quality is of advantage and having the resiliency of steel.

It is obvious that the details of construction may be varied without departing from the spirit of the invention and it is therefore understood that the invention is not to be limited to the specific construction shown and described, but only by the terms of the claim and the state of the prior art.

Having described my invention what I claim as new and desire to secure by Letters Patent, is:—

A composite piston ring comprising an outer shoe having a channelled portion on the inner side thereof, forming flanges, an inner ring having an external diameter equal to the internal diameter of said channelled portion, and snugly fitting therein said inner ring being formed as a channel with off set portions overlying the inner edges of the flanges of the shoe.

In testimony whereof I have hereunto set my hand.

CORNELIUS S. CLARK.